US012632677B2

(12) United States Patent
Soliman et al.

(10) Patent No.: US 12,632,677 B2
(45) Date of Patent: May 19, 2026

(54) ELECTRICITY METERING CIRCUIT FOR A MATRIX OPERATION CIRCUIT, SUMMATION CIRCUIT AND METHOD FOR OPERATION THEREOF

(71) Applicant: Robert Bosch GmbH, Stuttgart (DE)

(72) Inventors: Taha Ibrahim Ibrahim Soliman, Renningen (DE); Tobias Kirchner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 472 days.

(21) Appl. No.: 18/040,606

(22) PCT Filed: Aug. 12, 2021

(86) PCT No.: PCT/EP2021/072487
§ 371 (c)(1),
(2) Date: Feb. 3, 2023

(87) PCT Pub. No.: WO2022/043077
PCT Pub. Date: Mar. 3, 2022

(65) Prior Publication Data

US 2023/0297787 A1 Sep. 21, 2023

(30) Foreign Application Priority Data

Aug. 25, 2020 (DE) ..................... 10 2020 210 737.8

(51) Int. Cl.
*G06G 7/14* (2006.01)
*G06Q 50/06* (2024.01)

(52) U.S. Cl.
CPC ............... *G06G 7/14* (2013.01); *G06Q 50/06* (2013.01)

(58) Field of Classification Search
CPC .. G06G 7/14; G06G 7/12; G06G 7/00; G06Q 50/06; G06Q 50/00; G06N 3/065;
(Continued)

(56) References Cited

U.S. PATENT DOCUMENTS 4,012,725 A * 3/1977 Spangler ............. G06F 15/0233 708/130
10,381,074 B1 8/2019 Kim et al.
(Continued)

OTHER PUBLICATIONS

International Search Report for PCT/EP2021/072487, Issued Nov. 26, 2021.
(Continued)

*Primary Examiner* — Mohamed Charioui
(74) *Attorney, Agent, or Firm* — NORTON ROSE FULBRIGHT US LLP

(57) ABSTRACT

An electricity metering circuit for a matrix operation circuit, having a circuit input for an electrical input current that is an output current of the matrix operation circuit. The electricity metering circuit is set up to provide a ground potential at the circuit input, to integrate the input current at the circuit input over time, to store a storage charge that is increased up to a predetermined maximum storage charge in accordance with a proportionality constant, proportionally to the integrated input current, to quantify the integrated input current in a charge unit, the charge unit corresponding to the maximum storage charge taking into account the proportionality constant, and to determine the integrated input current rounded down to the nearest integer charge unit as a count sum.

18 Claims, 5 Drawing Sheets

(58) Field of Classification Search
CPC . G06N 3/02; G06N 3/049; G06N 3/00; G11C 11/54; G11C 11/5628; G11C 11/5621; G11C 11/56; G11C 11/00; G11C 13/0002; G11C 13/00
See application file for complete search history.

(56) References Cited

U.S. PATENT DOCUMENTS

| | | | | |
|---|---|---|---|---|
| 11,269,973 | B2 * | 3/2022 | Kodavanji | G06F 16/2255 |
| 11,636,325 | B2 * | 4/2023 | Lung | G06N 3/045 706/15 |
| 2018/0095722 | A1 * | 4/2018 | Buchanan | G06F 7/523 |
| 2019/0132602 | A1 * | 5/2019 | Halawani | G11C 13/004 |
| 2020/0312406 | A1 * | 10/2020 | Sharma | G11C 11/54 |
| 2020/0356847 | A1 * | 11/2020 | Yi | G06F 17/16 |
| 2020/0356848 | A1 * | 11/2020 | Lesso | G11C 13/004 |

OTHER PUBLICATIONS

Hays, "Design Considerations for Training Memristor Crossbars Used in Spiking Neural Networks," Rochester Institute of Technology Scholar Works, 2018, pp. 1-74. <https://scholarworks.rit.edu/cgi/viewcontent.cgi?article=10889&context=theses> Downloaded Feb. 2, 2023.

Jiang et al., "Pulse-Width Modulation Based Dot-Product Engine for Neuromorphic Computing System Using Memristor Crossbar Array," 2018 IEEE International Symposium On Circuits and Systems (ISCAS), IEEE, 2018, pp. 1-4.

Qureshi et al., "CMOS Interface Circuits for Reading and Writing Memristor Crossbar Array," Circuits and Systems (ISCAS), 2011 IEEE International Symposium On, 2011, pp. 2954-2957.

Cai et al., "A Fully Integrated Reprogrammable Memristor-CMOS System for Efficient Multiply-Accumulate Operations," Nature Electronics, vol. 2, No. 7, 2019, pp. 290-299.

* cited by examiner

ELECTRICITY METERING CIRCUIT FOR A MATRIX OPERATION CIRCUIT, SUMMATION CIRCUIT AND METHOD FOR OPERATION THEREOF

FIELD

The present invention relates to an electricity metering circuit for a matrix operation circuit, a summation circuit, a method for operating the summation circuit, and a computing unit and a computing module for carrying out the method.

BACKGROUND INFORMATION

In many computationally intensive tasks, especially artificial intelligence applications or machine learning applications, a processing of vectors using matrix operations is necessary. For example, vector-matrix multiplications must be performed. To perform such matrix operations quickly and efficiently, vector-matrix multipliers in the form of electronic circuits provided specifically for this purpose can be used.

In these vector-matrix multipliers, also known as "dot-product engines," a vector of input voltages is converted into a vector of output voltages by a configuration of memristors in the form of a matrix, which are situated at intersection points of lines running orthogonally to one another and connect the intersecting lines in pairs, the output voltages being in each case proportional to the scalar product (dot product) of the vector of input voltages and the conductivities of the memristors situated in a column. The input voltages are applied to the row lines running in one direction and result in currents over the memristors into the column lines running orthogonally thereto, whose potential is at ground. The currents can be converted by transimpedance amplifiers into the output voltages, which are converted into corresponding digital values by analog-digital converters. Such circuits can reach sizes of several hundred rows and columns each.

SUMMARY

According to the present invention, an electricity metering circuit for a matrix operation circuit, a summation circuit, a method for operating the summation circuit, and a computing unit and a computing module for carrying out the method are provided. Advantageous embodiments of the present invention are disclosed herein.

According to an example embodiment of the present invention, an output current of a matrix operation circuit is time-integrated by the electricity metering circuit, and the integral, i.e., the total charge that has flowed, is counted in a charge unit of measure that is proportional to a predetermined maximum storage charge of a storage charge stored in the electricity metering circuit. Through the provision of a ground potential at the circuit input, especially in the form of a virtual ground, the correct functioning of the matrix operation circuit is ensured. Time integration is advantageous because it allows the addition of a plurality of different output current vectors that correspond to different input voltage vectors.

A matrix operation circuit here refers to a circuit that generates a plurality of output currents (output vector or output current vector) that are a function of a plurality of input voltages (input vector or input voltage vector), so that in principle a vector-matrix operation is performed in which the input vector is mapped onto the output vector. Matrix entries that determine this mapping can be stored in storage elements configured in the form of a matrix. Row lines to which the input voltages are applied and column lines with current outputs at which the output currents are generated are provided. The metering circuit thus makes it possible to apply different input vectors at different successive times, over a period of time in each case, and to sum the different output vectors thus obtained.

The charge measuring unit is indirectly defined via the maximum storage charge, so that its numerical value, e.g., in coulombs, does not have to be known; however, it can be determined easily using proportionality, if desired.

According to an example embodiment of the present invention, preferably, the electricity metering circuit includes a current-voltage converter stage that is connected to the circuit input and is set up to provide the ground potential at the circuit input and to convert an input current at the circuit input into a first voltage proportional thereto; a voltage-current converter stage set up to convert the first voltage to a charge current proportional thereto; an integrator stage set up to store the storage charge and to provide a second voltage proportional to the storage charge, the charge current being supplied to the integrator stage to increase the storage charge; a comparison and discharge stage set up to compare the second voltage with a comparison voltage that is predetermined such that when the second voltage is equal to the comparison voltage, the storage charge is equal to the maximum storage charge, and when the second voltage exceeds the comparison voltage to discharge the storage charge in the integrator stage and to generate a count signal; and a count stage set up to store the count sum and, when the count signal is generated, to increment the count sum, or increase it by one. This realization by substantially series-connected individual stages allows for easy implementation by elementary circuits for each of the stages, properties of the counting circuit being easily realized by modifying the properties of individual stages. The proportionality (or proportionality constant) between charge measuring unit and maximum storage charge, i.e., between integrated input current and storage charge, is given by the combined proportionality of current-voltage converter stage and voltage-current converter stage, i.e., as the product of the respective proportionality constants.

A summation circuit according to an example embodiment of the present invention for the formation of partial sums (or partial vectors) of vector-matrix operations includes a matrix operation circuit that has a plurality of row lines each having a voltage terminal and a plurality of column lines each having a current output, and that is set up to generate, at the current outputs of the plurality of column lines, currents whose current strengths are a function of voltages applied to the voltage terminals, and one or more electricity metering circuits according to the present invention, each electricity metering circuit being assigned to a group of column lines comprising a number of column lines, the current outputs of the column lines within a group being connected to the current input of the electricity metering circuit assigned to the group. By providing electricity metering circuits according to the present invention at the current outputs of the matrix operation circuit, analog-digital converters for each of the current outputs or columns can be omitted. Further, it is made possible to successively apply different input voltage vectors and to add the respective output vectors using the electricity metering circuits. If separate analog-digital converters were provided, the respective converted digital output vectors would have to be added separately.

According to an example embodiment of the present invention, preferably, in the summation circuit for each column line, in the connection between the current output of the respective column line and the circuit input of the electricity metering circuit assigned to the group in which the respective column line is included, a semiconductor switching element, in particular a field-effect transistor, is provided that can switch the connection back and forth between a conducting and a non-conducting state. In this way, one column line in each group can be deliberately connected through to the respective electricity metering circuit, and if a plurality of voltage vectors are applied successively a different column line in the group can be selected in each case so that the partial sums are added up by the electricity metering circuit assigned to the group. Vectors or matrices that are too large for the matrix operation circuit (i.e., have more entries or rows than the matrix operation circuit has rows) can thus be broken down into parts and processed.

According to an example embodiment of the present invention, preferably, the matrix operation circuit of the summation circuit has a plurality of storage elements configured in the form of a matrix in rows and columns, each element being connected to a column line and to a row line, each of the storage elements being set up to conduct a current into the associated column line, which current is a function of the voltage applied to the respective row line and a storage state of the storage element. Through the storage state of the storage elements, individual matrix elements can be realized and modified by reprogramming (i.e., modifying) the storage states. For example, matrix multiplications can be realized this way.

In a method for operating a summation circuit according to an example embodiment of the present invention, the count sum of each of the electricity metering circuits is set to zero, one or more vectors of voltages are each applied to the voltage terminals for a predetermined period of time, and the count sums are read out. Thus, a summation of a plurality of output vectors is carried out automatically, so to speak, and the output vectors are obtained by the mapping of a plurality of input vectors onto the output vectors by the matrix operation circuit.

According to an example embodiment of the present invention, in the method, if a summation circuit is used comprising semiconductor switching elements, preferably during the respective time period in which one of the vectors of a plurality of voltages is applied, for each group of column lines exactly one of the semiconductor switching elements provided in the connections from the column lines (or their current outputs) of the group to the associated electricity metering circuit is switched to the conducting state, different semiconductor elements being switched to the conducting state for different vectors of a plurality of voltages. ‘Exactly one’ is to be understood in the standard sense, i.e., in each group one semiconductor switching element is switched to the conducting state and the other semiconductor switching elements in the groups are switched to the non-conducting state. The ‘exactly one semiconductor switching element’ selected in each case is thus changed between the time durations, i.e., when a new voltage vector is applied. Thus, as described above, large vectors or matrices can be processed by the adding up of partial sums by the electricity metering circuits.

According to an example embodiment of the present invention, preferably, the time duration is selected such that each of the count sums is greater than a minimum count sum, the minimum count sum being at least 20, preferably at least 50, more preferably at least 100. Rounding errors due to the electricity metering circuits can be kept small in this way.

Alternatively or additionally, a remainder of the rounding down of the integrated input current to the count sum can preferably be determined in each case after the count sums have been read out. A preferred possibility for this is to determine the remainder by measuring the remaining storage charge, taking into account the proportionality between maximum storage charge and charge unit. By measuring the remaining charges, the remainder can be determined very accurately.

In another preferred possibility for determining the remainder(s), the method according to an example embodiment of the present invention includes, before the setting of the count sums to zero, determining a vector of reference voltages and a reference time duration such that an application of the reference voltages to the voltage terminals over the reference time duration produces currents at the current outputs that, integrated over the reference time duration, correspond to a reference charge that is a fraction of the unit charge of the respective electricity metering circuit; and, after reading out the count sums in a plurality of passes the reference voltage is applied to the voltage terminals over the reference time period, it is checked, for each of the electricity metering circuits that has not yet been excluded from the check, whether the respective count sum has changed, and, if the count sum has changed, excluding the respective electricity metering circuit from the check and determining the respective remainder based on the number of passes carried out, the remainder further preferably being determined as the unit charge minus the reference charge multiplied by the number of passes carried out before the current pass. The accuracy here is a function of the selected fraction. A particular advantage here is that analog-digital converters, which convert residual storage charge into digital measured values, can be omitted, so that no additional components are required for the summation circuit. If a summation circuit with semiconductor switching elements and column lines divided into groups is used, then during the performance of these method steps for determining the remainder, in each group one semiconductor switching element or a plurality of semiconductor switching elements should be switched to the conductive state, this being always the same one or the same ones for different steps of the determination of the remainder.

A computing unit according to the present invention is set up, in particular in terms of programming, to carry out a method according to the present invention.

A computing module according to the present invention, e.g., a neural network computing module or artificial intelligence accelerator module, has a summation circuit according to the present invention and a computing unit according to the present invention.

The implementation of a method according to the present invention in the form of a computer program or computer program product having program code for carrying out all the method steps is also advantageous, because this results in particularly low costs, especially if an executing computing unit is used for other tasks and is therefore present anyway. Suitable data carriers for providing the computer program are in particular magnetic, optical, and electrical memories, such as hard disks, flash memories, EEPROMs, DVDs, and others. It is also possible to download a program via computer networks (Internet, Intranet, etc.).

Further advantages and embodiments of the present invention result from the description and the figures.

The present invention is shown schematically on the basis of exemplary embodiments in the figures and is described below with reference to the figures.

Unless otherwise noted, in the context of the present application the term "connected" or the like refers to an electrically conductive connection, i.e., is to be understood in the sense of "electrically conductively connected."

DETAILED DESCRIPTION OF EXAMPLE EMBODIMENTS

Figure 1A:
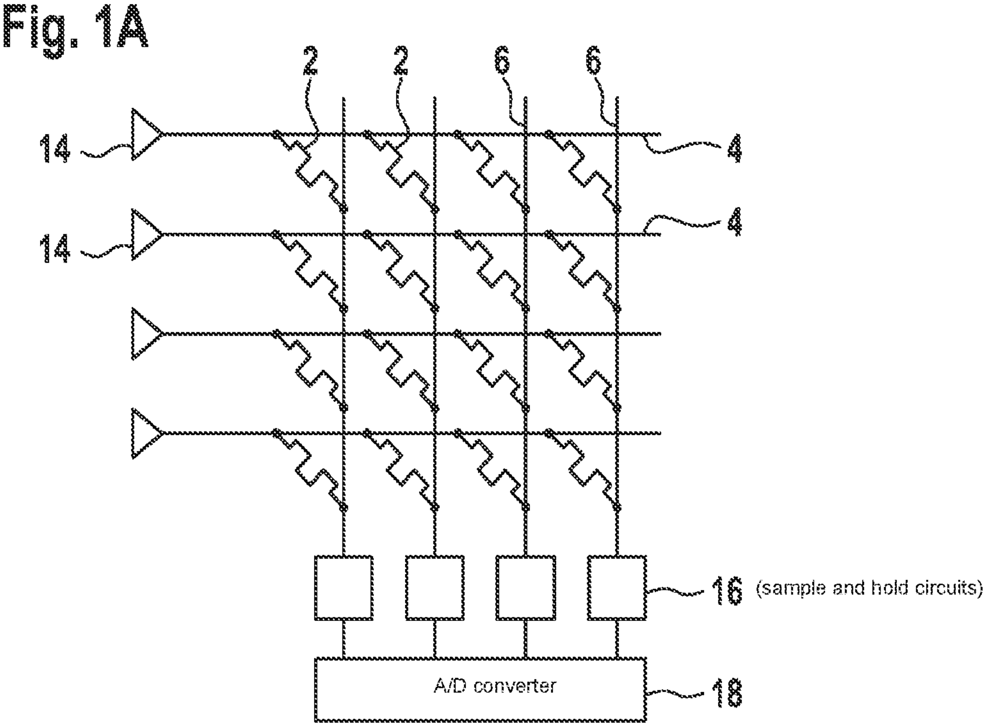
FIGS. 1A and 1B show a vector matrix multiplier not according to the present invention.
Figure 1B:
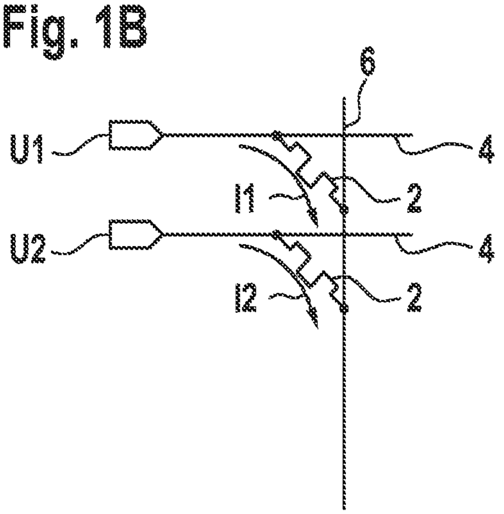

FIGS. 1A and 1B depict a vector matrix multiplier, also referred to as a "dot product engine," in which electricity metering circuits according to the present invention can be used. The vector matrix multiplier comprises storage cells in the form of memristors 2, configured in rows and columns. The number of rows and the number of columns are arbitrary in each case; a 4×4 configuration is shown as an example. The storage function of the memristors results from the fact that the resistance of the memristors can be adjusted by applying a programming voltage.

The vector-matrix multiplier further has a row line 4 for each row of the matrix configuration and a column line 6 for each column (for clarity, only some elements are provided with reference signs in each case). The memristors 2 are arranged at the intersection points of the row and column lines running perpendicular to each other, and each connects a row line to a column line that are not otherwise connected.

When voltages are applied to the row lines, currents flow from the row lines 4 through the memristors 2 into the column lines 6. This is illustrated for one column and two rows in FIG. 1B. There, a voltage U1 is applied to one of the row lines and a voltage U2 is applied to the other. The current I1 through one of the memristors is determined by its conductivity G1: I1=G1 U1; the current I2 through the other memristor, whose conductivity is G2, is correspondingly I2=G2·U2. The sum of the currents then flows through column line 6, i.e., the total current I=I1+I2=G1·U1+G2·U2. Thus, there takes place a multiplication of the voltages U1, U2, taken as a vector, at the row lines 4 by the conductivities G1, G2, taken as a vector, of the memristors in a column, the total current being proportional to the result of this vector product. In relation to the entire matrix configuration, in principle there thus takes place a multiplication of the vector of the voltages by the conductivities of the memristors, taken as matrix elements.

The voltages on the row lines are typically generated from digital signals using digital-analog converters 14. The total current of each column, which is an output current of the column line, can be converted to an output voltage using a transimpedance amplifier. The output voltages are usually converted back into a digital signal at the column lines using sample-and-hold circuits 16 and an analog-digital converter 18.

Figure 2:
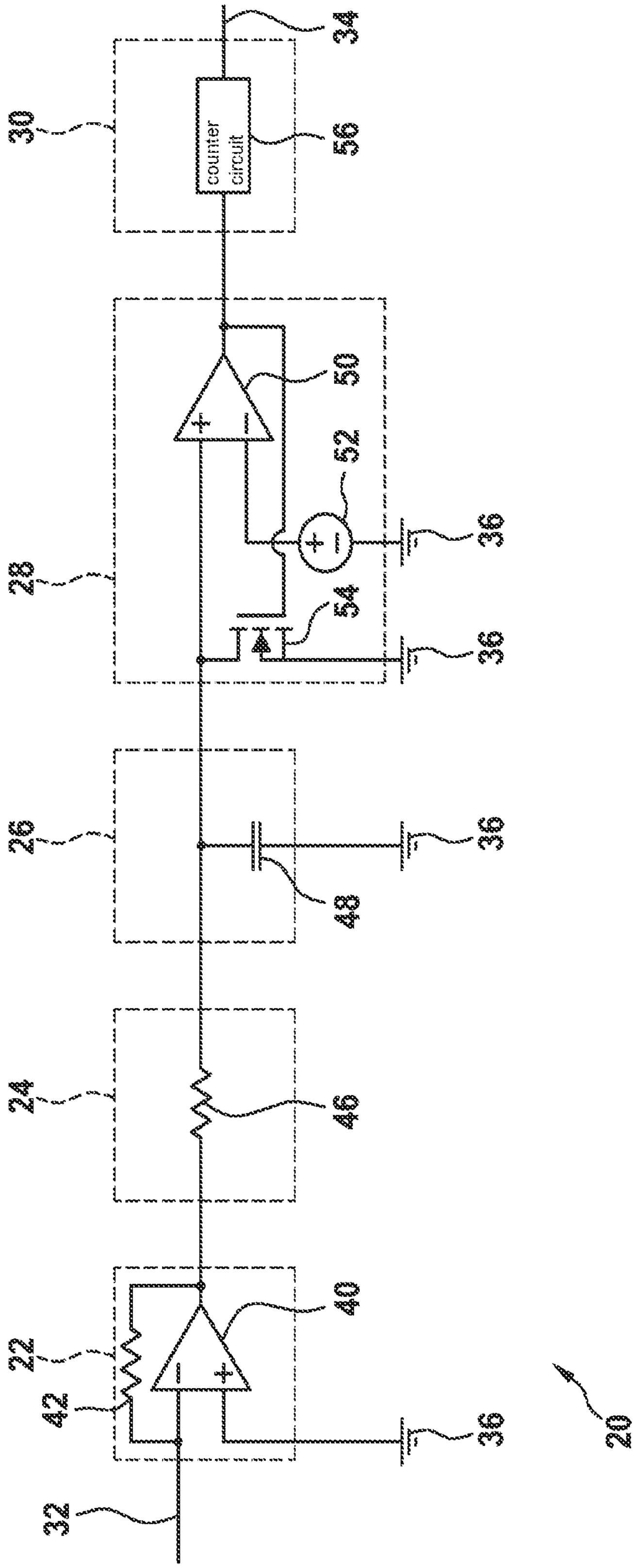
FIG. 2 shows the structure of a preferred electricity metering circuit according to the present invention.

FIG. 2 shows a metering circuit 20 according to a preferred specific embodiment of the present invention. The metering circuit includes a plurality of functional units connected in series, namely a current-voltage converter stage 22, a voltage-current converter stage 24, an integrator stage 26, a comparison and discharge stage 28, and a counter stage 30. The metering circuit 20 further has a circuit input 32 and a circuit output 34.

The current-voltage converter stage 22 is connected to the circuit input 32 and is set up to convert an input current at the circuit input 32 to a first voltage proportional thereto. The input current is an output current of a matrix operation circuit, such as that shown in FIG. 1A, 1B, or 3. As shown, the current-voltage converter stage 22 may be formed as a so-called transimpedance amplifier having an operational amplifier and a resistor 42, the inverting input (marked "–") of the operational amplifier 40 being connected to the circuit input 32 and being counter-coupled to the output of the operational amplifier 40 via the resistor 42. The non-inverting input (marked "+") of the operational amplifier 40 is connected to a reference potential 36, such as a ground, for example via a (ground) connection (not further shown). With this circuit, the proportionality constant between current and first voltage is given by the resistance value of resistor 42. Here, due to the high gain factor of the operational amplifier (i.e., the voltage at the output of the operational amplifier is a high multiple, e.g., 100,000, of the voltage difference at the inputs of the operational amplifier), the voltage at the inverting input is substantially pulled to the reference potential, i.e., to ground. "Substantially" is to be understood here as meaning that (for currents that are standard in matrix operation circuits) the voltage difference is less than one millivolt, in particular only a fraction of a millivolt, e.g., less than 0.1 mV, so that from the point of view of a matrix operation circuit (in which operating voltages of a few volts are present) to which circuit input 32 is connected (see FIG. 3), circuit input 32 is at ground or ground potential in terms of circuitry and measurement. This "ground" at the inverting input of operational amplifier 40 or at the circuit input is also referred to as "virtual ground."

The output of current-voltage converter stage 22 formed by the output of operational amplifier 40 is connected to voltage-current converter stage 24, which is set up to convert the (first) voltage applied there into a current proportional thereto, hereinafter referred to as the charging current, because it is used for charging a charge (the storage charge) stored in integrating stage 24. In the simplest case this can be done by a resistor 46, as shown. Alternatively, a semiconductor switch such as a field-effect transistor (FET), preferably a metal oxide field-effect transistor (MOSFET) operated in the linear range, can be used.

The charging current is conducted to integrating stage 24, which is set up to store an electrical charge, referred to as a storage charge, and to generate or provide a second voltage proportional to the stored storage charge. The storage charge is increased by the charging current. In the simplest case, as shown, a capacitor 48 is used to store the storage charge; the second voltage is then the voltage at the capacitor, i.e., the capacitor voltage. A (first) terminal of capacitor 48 is connected to current-voltage converter stage 22 (via an input of integrating stage 24 not explicitly shown), and the other (second) terminal of capacitor 48 is connected to reference potential (ground) 36. The first terminal of capacitor 48 is likewise connected to the output (not explicitly shown) of integrating stage 36, so that the capacitor voltage is applied there and is proportional to the charge stored in the capacitor, i.e., forms the second voltage.

According to another specific embodiment (not shown), integrating stage 24 can include a capacitor and an operational amplifier that is fed back via the capacitor, i.e., the capacitor is connected between the output of the operational amplifier and the inverting input of the operational amplifier. In this specific embodiment, the inverting input of the operational amplifier acts as the input of the integrating stage 26, i.e., as the connection for the charging current; the non-inverting input of the operational amplifier is connected to the reference potential (ground) and the output of the operational amplifier acts as the output of the integrating stage 26, i.e., the second voltage is applied here. The advantage of this specific embodiment over the simpler specific embodiment shown is that a capacitor with lower capacitance can be used.

The second voltage acts as input signal for the comparison and discharge stage 28 (corresponding inputs and outputs are not explicitly designated in the figure). The compare and discharge stage 28 is set up to compare the second voltage (which here is equal to the capacitor voltage) applied at its input with a comparison voltage and, if the second voltage exceeds the comparison voltage, to generate a count signal and discharge the charge stored in integrating stage 26. A comparator 50 can be used to compare the voltages, the non-inverting input (marked "+") being connected to the input of the comparison and discharge circuit 28 (i.e., the second voltage is applied there) and the inverting input (marked "−") being connected to a constant voltage source 52 that generates the comparison voltage (and is itself connected to reference potential 36, so that the comparison voltage is generated with respect thereto). The constant voltage source can be part of the comparison and discharge stage 28, as shown. However, it is preferred that (not shown) the comparison voltage of the comparison and discharge stage is provided externally, i.e., the constant voltage source is then not a component of the comparison and discharge stage 28. In particular, a single comparison voltage (provided by a single constant voltage source) can then also be used as the comparison voltage for a plurality of comparison and discharge stages included in a plurality of electricity metering circuits.

The output of comparator 50 is connected to the control terminal of a switching element 52, here a semiconductor switching element, in particular a field-effect transistor (FET), preferably a metal oxide field-effect transistor. The comparator 50 is set up (i.e., correspondingly selected) to generate a voltage at its output that is in a first range (e.g., less than or equal to OV) in which switching element 52 is in an open state (non-conducting state, FET blocks) when the voltage at the non-inverting input is less than the voltage at the inverting input, and to generate a voltage at its output that is in a second range (e.g., greater than OV, in particular greater than the threshold voltage of the FET) in which switching element 52 is in a closed state (conducting state, FET conducts) when the voltage at the non-inverting input is greater than the voltage at the inverting input. Switching element 54 is connected to integrating stage 26 in such a way that when it is in the non-conducting state, the storage charge can be charged by the charging current, and when it is in the conducting state the storage charge is discharged to ground (reference potential).

Figure 3:
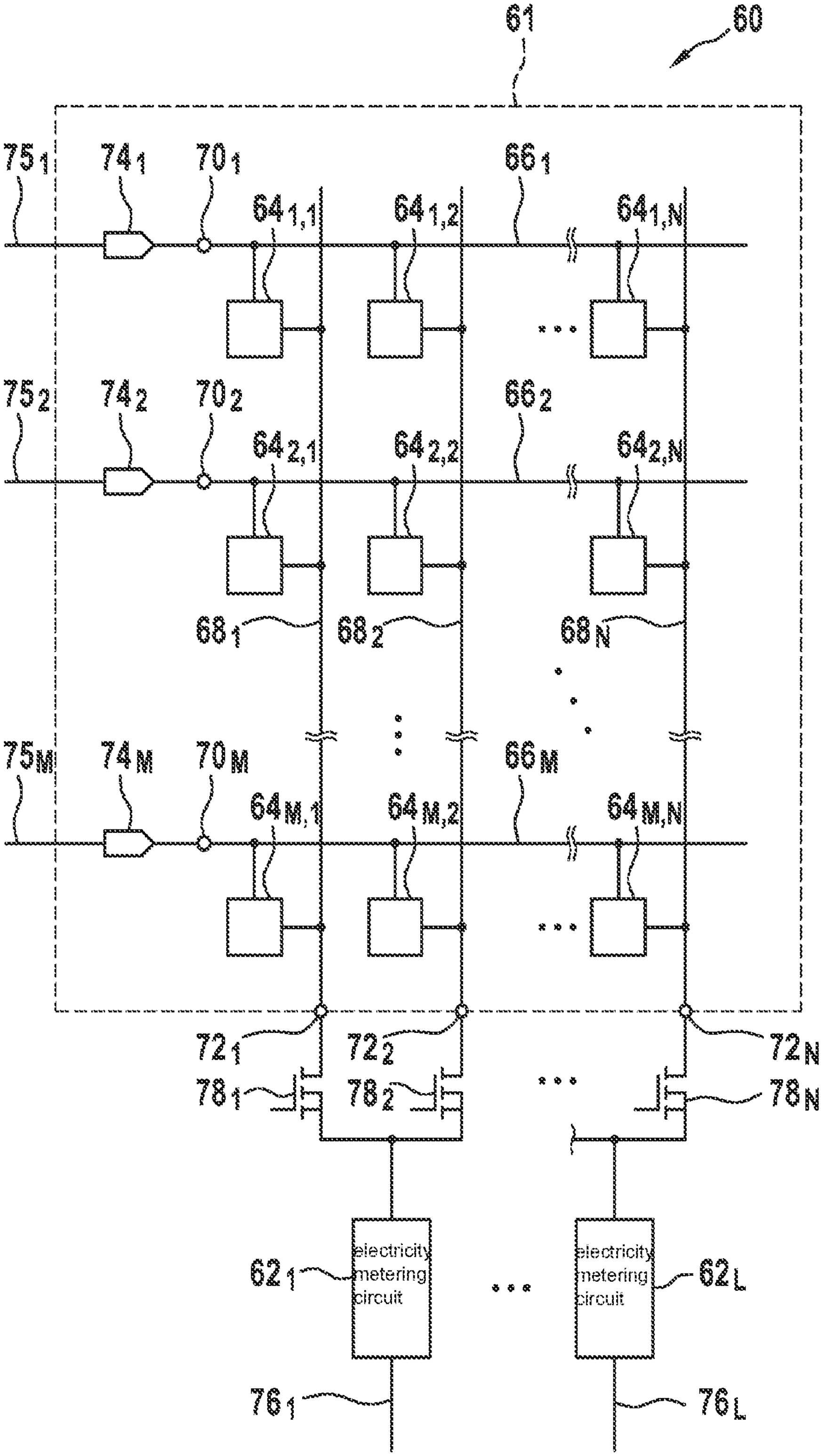
FIG. 3 shows a summation circuit according to a preferred specific embodiment of the present invention.

In the specific embodiment of FIG. 3, switching element 54 is on the one hand connected with a terminal (e.g., the drain terminal of the FET) to the input of the comparison and discharge circuit and on the other hand is connected with a terminal (e.g., the source terminal of the FET) to reference potential 36. Via the control terminal, the path between these two terminals can be switched back and forth between a non-conducting state (open state, FET blocks) and a conducting state (closed state, FET conducts). As soon as switching element 54 switches into the conductive state, i.e., as soon as the second voltage exceeds the comparison voltage, capacitor 48, whose first terminal is connected to the input of comparison and discharge circuit 28, is discharged via switching element 54. As a result, the capacitor voltage, i.e., the second voltage, falls to zero, and thus in particular again becomes smaller than the comparison voltage.

During this process, a voltage signal is generated at the output of comparator 50 at which the output voltage at the comparator is briefly in the second range: initially, during the rise of the second voltage (second voltage<comparison voltage), the output voltage is in the first range; if the second voltage exceeds the comparison voltage, the output voltage is temporarily in the second range, and the charge is discharged; as a result of the discharge, the second voltage falls back below the comparison voltage, so that finally the output voltage is again in the first range. This voltage signal represents the count signal generated at the output of comparison and discharge stage 28, which is connected to the output of comparator 50.

Further shown is a counting stage 30 comprising a counter circuit 56 used to form the count sum, the count sum being incremented by one with each count signal. Such counter circuits are conventional to those skilled in the art; they can be formed e.g., by flip-flops connected in series. The result, i.e., the count sum, can be read out via circuit output 34 connected to the counting stage or the counter circuit, for example as a digital value, corresponding to the respective states of the flip-flops when these are used to realize the counter circuit. Furthermore, at least one reset line (not shown) is preferably provided, by which the count sum formed in the counting stage or the counter circuit can be reset to zero.

Since the charge stored in integrating stage 26 (capacitor 48) is proportional to the second voltage, the counting signal is generated exactly when a certain maximum storage charge, referred to as the maximum storage charge, is stored in the integrating stage 26, i.e., when a certain integrated charging current has flowed into it. Since the charging current is in turn proportional to the input current due to the current-voltage converter stage 22 and voltage-current converter stage 24 described above, the counting signal is generated exactly when, since the last discharge, a certain time-integrated input current has flowed into the electricity metering circuit, i.e., when a certain amount of charge that defines a charge unit has flowed into the electricity metering circuit. Accordingly, the charge unit is defined such that it is related to the maximum storage charge via the combined proportionality constant of current-voltage converter stage 22 and voltage-current converter stage 24. The integrated input current flowing into the electricity metering circuit, which represents an input charge quantity, is thus counted or quantified in charge units determined by the comparison voltage (of which the maximum storage charge is a function). In each case, the count sum is the input charge quantity rounded down to the nearest integer value and quantified in charge units. The comparison voltage can be chosen accordingly so that the charge unit is of a certain magnitude (e.g., in coulombs). Capacitor 48 or integrating stage 26 must be appropriately dimensioned so that it can store a charge corresponding to the charge unit (i.e., taking into account the proportionality constants of current-voltage converter stage 22 and voltage-current converter stage 24, and taking into account the specific implementation of integrating stage 26).

FIG. 3 shows a summation circuit 60 according to a preferred specific embodiment of the present invention. Summation circuit 60 includes a matrix operation circuit 61 (e.g., as shown in FIGS. 1A and 1B) and a plurality of electricity metering circuits 621, 622, . . . 62L. In each case, an electricity metering circuit is assigned to a group of column lines, each group here comprising, as an example, two column lines, and only the first group (with column lines 721 and 722) being shown in its entirety.

Matrix operation circuit 61 has a plurality of storage elements arranged in rows (number M) and columns (number N) in the form of a matrix 641,1, 641,2, . . . 641,N, 642,1, 642,2, . . . 642,N, . . . 64N,1, 64N,2, . . . 64M,N. For each row a row line 661, 662, . . . 66M is provided and for each column a column line 681, 682, . . . 68N is provided. The storage elements are each connected to a row line and to a column line. Each storage element has a storage state (e.g., in the form of a conductance value, as described in connection with FIG. 1A) and is set up to generate, in the column line to which it is connected, a current that is a function of the storage state and of the voltage applied to the row line to which the storage element is connected. Overall, in this way currents are generated at current outputs 721, 722, . . . 72N of the column lines that are a function of a plurality of voltages applied to voltage inputs 701, 702, . . . 70M of the row lines. For the function of the matrix operation circuit 61, at the current outputs 721, 722, . . . 72N, a reference potential (ground) has to be present to which the voltages applied to the voltage inputs 701, 702, . . . 70M refer. The plurality of voltages at the voltage inputs can be regarded as an input vector (of voltages) or input voltage vector, or vector of input voltages. The plurality of currents at the current outputs can be regarded as an output vector (of currents) or output current vector, or vector of output currents.

The storage states of the storage elements correspond approximately to matrix entries by which the mapping of input vectors to output vectors realized by the matrix operation circuit is determined. The storage elements may be formed, for example, by memristors as described in connection with FIGS. 1A, 1B; the storage state is then determined by the conductance of the memristors. However, other realizations are also possible; e.g., in addition to the memristors the storage elements can each include a semiconductor switching element (such as a field-effect transistor) with which the respective memristor can be controlled in a deliberate manner. In this case, further control lines are provided for the semiconductor switching elements. More generally, additional lines necessary for the respective realization of the storage elements may be provided.

The matrix operation circuit 61 may further include, for each row, a digital-analog converter 741, 742, . . . 74M, the outputs of which are each connected to a row line or to a voltage input 701, 702, . . . 70M and whose inputs form the inputs 751, 752, . . . 75M of summation circuit 60. The digital-analog converters are used to generate corresponding voltages, which can be applied to the row lines, from input values or input vectors present in digital form, e.g., a vector of M numerical values. Digital-analog converters can also be omitted if the input vectors are in analog form as voltages; the inputs of the summation circuit are then directly connected to the voltage inputs of the matrix operation circuit.

The electricity metering circuits 621, 622, . . . 62L are each connected to one of the groups of column lines, i.e., the circuit input of each of the electricity metering circuits 621, 622, . . . 62L is connected to the current outputs 721, 722, . . . 72N of those column lines that are included in the group to which the respective electricity metering circuit is assigned. For example, the circuit input of the electricity metering circuit 611 is connected to the current outputs 721 and 722 of the column lines 681 and 682, which form a group. This is analogously the case for the further electricity metering circuits or column lines (not explicitly shown in the figure). In the connections between the current outputs and the circuit inputs, semiconductor switching elements 781, 782, . . . 78N (here, for example, field-effect transistors) are preferably provided in each case, so that each of the connections can be switched back and forth between a conducting and a non-conducting state. Control lines for the semiconductor switching elements are not further shown. Using the semiconductor switching elements 781, 782, . . . 78N, individual column lines or their current outputs can be deliberately selected and connected to the corresponding electricity metering circuit. It is thus possible to connect, in each case, exactly one of the column lines within each of the groups in sequence to the electricity metering circuit assigned to the respective group. The respective electricity metering circuit sums the currents, which in principle represent the results of a vector product, within the group. In this way, vector products of vectors can be calculated that have more entries than the matrix operation circuit has rows. In the example shown, in which in each case two column lines are connected to an electricity metering circuit, i.e., form a group, vector products or vector-matrix products of vectors having twice as many entries as the matrix operation circuit has rows can be calculated accordingly. Each column of the matrix is divided into a plurality of parts (here two), each part of the matrix column corresponding to a column or column line within a group; i.e., the storage elements in the respective column (in the group) are programmed in a manner corresponding to the matrix entries in the respective part of the matrix column. Analogously, the vector to be multiplied by the matrix is divided into a plurality of parts that are applied in sequence to the inputs of the matrix operation circuit, and in each group, only the semiconductor switching element corresponding to the respective part is switched to the conductive state.

The groups of column lines should preferably each include the same number of column lines. This number can be between one (i.e., one electricity metering circuit is associated with each column line, and one semiconductor switching element can be provided in the connection between the current output and the electricity metering circuit in each case) and the number of column lines (i.e., a single electricity metering circuit is assigned to all of the column lines, and one semiconductor switching element can be respectively provided in each of the connections between the current outputs and the electricity metering circuit).

The fact that the electricity metering circuits each provide a ground potential at their circuit input ensures the function of the matrix operation circuit (see for example the functional description in connection with FIGS. 1A, 1B). The counter sums are provided at outputs of the electricity metering circuits or can be read out there; these outputs form the outputs 761, 762, . . . 76L of the summation circuit 60.

The electricity metering circuits are preferably realized as described in connection with FIG. 2.

Figure 4:
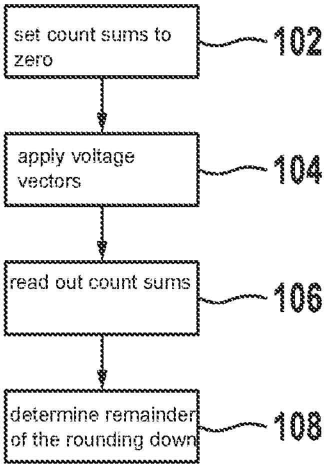
FIG. 4 shows a flow diagram of a method for operating a summation circuit according to a preferred specific embodiment of the present invention.

FIG. 4 shows a preferred method for operating a summation circuit according to the present invention. In the method, first in step 102 the count sum of each of the electricity metering circuits is set to zero, i.e., the summation circuit is initialized.

In step 104, one or more vectors of voltages, or voltage vectors, are applied (in sequence) to each of the voltage terminals for a predetermined period of time. This has the result that the currents at the current outputs of the matrix operation circuit have in each case, for the respective time duration, the current strengths resulting from the matrix operation circuit, in particular also from the storage states of the storage elements, and that these currents are integrated or summed up by the electricity metering circuits over a plurality of successive time durations and the respective total input charge is quantified by the electricity metering circuit in charge units, and a corresponding count sum is formed.

If the summation circuit includes semiconductor switching elements, as shown in FIG. 3, and if one circuit is associated with a group of column lines in each case, whose current outputs are connected to the electricity metering circuit, then preferably, when different vectors of voltages are applied, in each case exactly one different column line or its current output in each group is connected to the electricity metering circuit assigned to the group (by switching the corresponding semiconductor switching element to the conducting state, while the other semiconductor switching elements in the group are switched to the non-conducting state). In other words (in case of a plurality of voltage vectors) for each voltage vector first exactly one semiconductor switching element in each group is switched into the conducting state (for different voltage vectors these are different semiconductor switching elements) and then the voltage vector is applied for the predetermined period of time (i.e., the voltages of the voltage vector are applied to the row lines), proceeding in this way for each voltage vector in sequence. Here the number of voltage vectors should be equal to or smaller than the number of column lines in a group. The electricity metering circuits add up the partial sums to form count sums.

In the further step 106, the count sums are read out. The count sums then form a digital output vector, or output sum vector, in which the different (partial) vectors (present during each of the time durations corresponding to the different input voltage vectors) of the output currents at the current outputs of the matrix operation circuit are summed.

In general, a rounding error occurs because rounding down to integer multiples of the charge unit is used to form the count sums. Preferably, the time duration is selected such that each of the count sums is greater than a minimum count sum, the minimum count sum being at least 20, further preferably at least 50, most preferably at least 100. Rounding errors can be kept small in this way; e.g., for the specified minimum count sums, smaller than 5%, smaller than 2%, or smaller than 1%. Alternatively or additionally, however, a remainder of the rounding down is determined in the optional step 108. This remainder can then be added to the count sum to obtain a more accurate result or more accurate result vector.

For this purpose, the remainder can be determined by measuring the remaining storage charge. Here, the proportionality constant between the maximum storage charge and the charge unit has to be taken into account.

Figure 5:
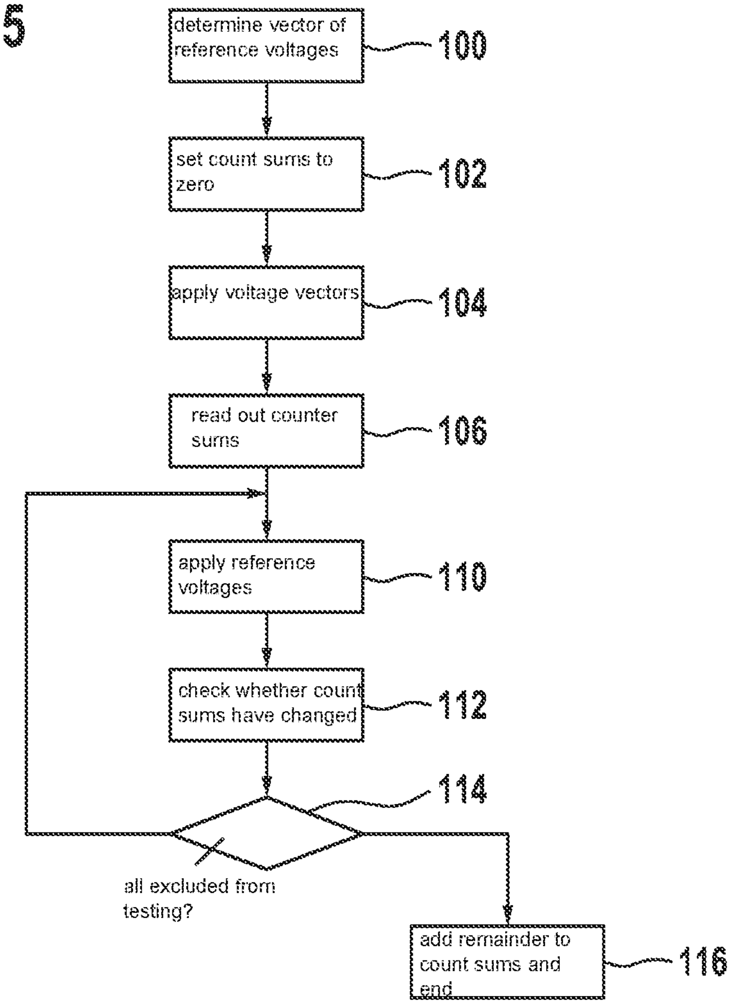
FIG. 5 shows a flow diagram of a method for operating a summation circuit according to a further preferred specific embodiment of the present invention.

Alternatively, the remainder can be determined as follows, cf. FIG. 5. First, in step 100, before setting the count sums to zero, a vector of reference voltages and a reference time duration are determined such that an application of the reference voltages over the reference time duration to the voltage terminals produces currents at the current outputs that, integrated over the reference time duration, correspond to a reference charge that is a fraction of the unit charge of the respective electricity metering circuit.

Steps 102, 104, 106 (setting the count sums to zero, applying the voltage vectors each for a period of time, and reading out the count sums) are then performed subsequently, as described in connection with FIG. 4.

To determine the remainders of the roundings down, the following is then carried out in a plurality of passes. In each pass, in step 110 the reference voltages (i.e., the reference voltage vector) are applied to the voltage terminals over the reference time duration.

In step 112, for each of the electricity metering circuits that has not yet been excluded from checking, it is checked whether the respective count sum has changed (at the beginning, i.e., after the reading out of the count sums in step 106, all electricity metering circuits are clearly defined as not yet excluded). If the count sum of an electricity metering circuit has changed, this circuit is excluded from checking and the respective remainder is determined based on this; e.g., preferably calculated as the unit charge minus the reference charge, multiplied by the number of passes carried out before the current pass. Thus, in principle in the preferred calculation rounding up to the next fraction takes place; the last, present pass is not taken into account in the calculation of the remainder in order to prevent a negative remainder from being calculated for fractions that are not whole numbers.

In step 114 it is checked whether all electricity metering circuits are excluded from testing; if this is the case, then in step 116 the method is ended and the determined remainders are added to the respective count sums; otherwise, i.e., if not all electricity metering circuits have been excluded from the checking yet, the procedure continues again with step 110 (application of the reference voltage over the reference time period).

The advantage of this specific embodiment is that no analog-digital converters need to be provided here in order to convert analog measured values, which occur for example when measuring the remaining storage charges, into digital values.

Figure 6:
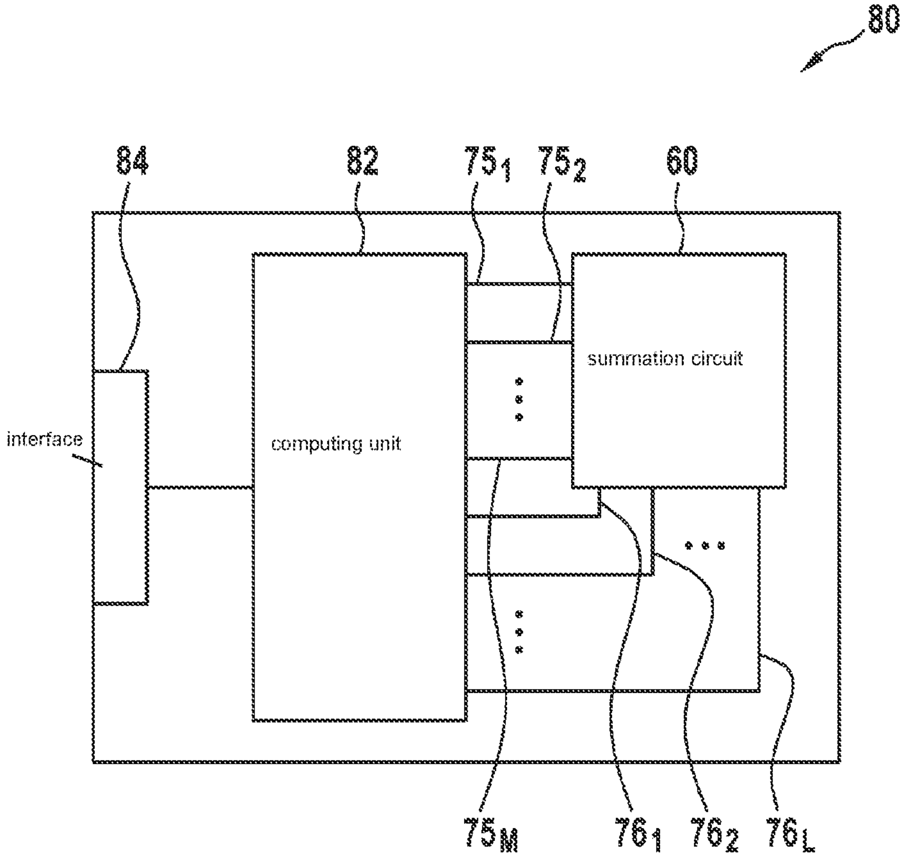
FIG. 6 shows a computing module according to a preferred specific embodiment of the present invention.

If a summation circuit with semiconductor switching elements is used (as in FIG. 3), then in each group the same semiconductor switching element(s) should be switched to the conducting state during steps 100, 110 (in which voltage vectors are applied). FIG. 6 shows a computing module 80 according to the present invention in the form of a neural network computing module, i.e., a computing module for performing and accelerating matrix computations in the context of applications in the field of neural networks or artificial intelligence. Computing module 80 includes a summation circuit 60 according to the present invention, such as is shown in FIG. 3. Further, the computing module comprises a computing unit 82 set up to carry out a method according to the present invention, such as one of the methods described in connection with FIGS. 4 and 5. The computing unit may include, for example, a processor core and/or a field programmable gate array (FPGA) and associated working memory. Computing unit 82 is connected via corresponding lines to the inputs 751, 752, . . . 75M of summation circuit 60 and to the outputs 761, 762, . . . 76L of summation circuit 60; in addition, control lines (not shown for clarity) may be provided for controlling semiconductor switching elements that are connected between the current outputs of the matrix operation circuit included in the summation circuit and the electricity metering circuits also included in the summation circuit (as shown and explained in connection with FIG. 3). Via these lines, on the one hand the input vectors (digital or analog) and, if appropriate, control signals for the semiconductor switching elements are transmitted to the summation circuit, and, on the other hand, the output vectors are read out. Further, computing module 80 includes an interface 84 that is connected to computing unit 80 and is used for external communication. The interface can be realized as a parallel or serial interface, e.g., USB (Universal Serial Bus), PCI (Peripheral Component Interconnect), PCI-Express, or other conventional interfaces; an interface for wireless communication is also possible. The computing module can be accessed via interface 85, for example by a computer that is connected to the computing module via the interface. Clearly, the computing module may include further units and lines (not shown) that are used in particular for programming the storage elements of the matrix operation circuit included in the summation circuit 60. A programming unit (not shown) that controls corresponding programming lines (which may be in part identical with the row and column lines) can be included in computing unit 82 or, at least in part, can be realized as a separate unit on the computing module. In principle, it is also possible for summation circuit 60 to be integrated into a plug-in module that can be plugged into a corresponding socket on the computing module. The programming of the storage elements can then take place in a separate programming device that is independent of the computing module.

What is claimed is:

1. An electricity metering circuit for a matrix operation circuit, the electricity metering circuit comprising:
- a circuit input for an electrical input current that is an output current of the matrix operation circuit;
- wherein the electricity metering circuit is configured to:
  - provide a ground potential at the circuit input;
  - integrate the input current at the circuit input over time;
  - store a storage charge that is increased up to a predetermined maximum storage charge proportionally to the integrated input current, in accordance with a proportionality;
  - quantify the integrated input current in a charge unit, where the charge unit corresponds to the maximum storage charge, taking into account the proportionality; and
  - determine the integrated input current, rounded down to the nearest integer charge unit, as a count sum.

2. The electricity metering circuit as recited in claim 1, further comprising:
- a current-voltage converter stage connected to the circuit input and configured to provide the ground potential at the circuit input, and to convert an input current at the circuit input into a first voltage proportional to the input current;
- a voltage-current converter stage configured to convert the first voltage into a charging current proportional to the first voltage;
- an integrating stage configured to store the storage charge and to provide a second voltage proportional to the storage charge, the charging current being supplied to the integrating stage to increase the storage charge;
- a comparison and discharge stage configured to compare the second voltage with a comparison voltage that is predetermined such that when the second voltage is equal to the comparison voltage the storage charge corresponds to the maximum storage charge, and when the second voltage exceeds the comparison voltage, to discharge the storage charge stored in the integrating stage and to generate a count signal; and
- a counting stage configured to store the count sum and, when the count signal is generated, to increase the count sum by one.

3. The electricity metering circuit as recited in claim 2, wherein the current-voltage converter stage includes an operational amplifier and a resistor, the circuit input being connected to an inverting input of the operational amplifier, the resistor being counter-coupled between an output of the operational amplifier and the inverting input of the operational amplifier, and a non-inverting input of the operational amplifier being connected to ground or a ground terminal.

4. The electricity metering circuit as recited in claim 2, wherein the voltage-current converter stage includes: (i) a resistor at which the first voltage drops, or (ii) a semiconductor switch operated in the linear range having a control terminal to which the first voltage is applied, the semiconductor switch being a metal oxide field-effect transistor.

5. The electricity metering circuit as recited in claim 2, wherein: (i) the integrating stage includes a capacitor in which the storage charge is stored, the second voltage being given as a voltage at the capacitor, or (ii) the integrating stage has a capacitor in which the storage charge is stored and has an operational amplifier that is counter-coupled via the capacitor, the second voltage being given as a voltage at an output of the operational amplifier.

6. The electricity metering circuit according to claim 2, wherein the comparison and discharging stage includes a comparator that is configured to compare the second voltage with the comparison voltage, and to generate the count signal at an output of the comparison and discharging stage, the output of the comparison and discharging stage being further connected to a switching element that is switched to a conductive state when the count signal is present, and is configured to discharge the storage charge in a conductive state.

7. The electricity metering circuit as recited in claim 1, wherein a second voltage is associated with the storage charge, and further comprising:
- a comparison and discharge stage configured to:
  - compare the second voltage to a comparison voltage,
  - discharge, in response to the second voltage being greater than or equal to the comparison voltage, the stored storage charge; and
  - generate, in response to the second voltage being greater than or equal to the comparison voltage, a count signal, wherein the count sum is incremented based on the count signal, and wherein the storage charge corresponds to the maximum storage charge.

8. A summation circuit for forming partial sums of vector matrix operations, comprising:
- a matrix operation circuit that has a plurality of row lines each having one voltage terminal, and a plurality of column lines each having one current output, and the matrix operation circuit being configured to generate currents at the current outputs of the plurality of column lines, current strengths of which are a function of voltages applied to the voltage terminals; and
- one or more electricity metering circuits, each of the electricity metering circuits including:

a circuit input;

wherein the electricity metering circuit is configured to:

provide a ground potential at the circuit input;

integrate the input current at the circuit input over time;

store a storage charge that is increased up to a predetermined maximum storage charge proportionally to the integrated input current, in accordance with a proportionality;

quantify the integrated input current in a charge unit, where the charge unit corresponds to the maximum storage charge, taking into account the proportionality; and determine the integrated input current, rounded down to the nearest integer charge unit, as a count sum;

wherein each of the electricity metering circuits is assigned to a respective group of the column lines that includes a number of column lines, current outputs of the column lines within a group being connected to the current input of the electricity metering circuit assigned to the group.

9. The summation circuit as recited in claim 8, wherein a semiconductor switching element is provided for each of the column line in a connection between the current output of the column line and the circuit input of the electricity metering circuit assigned to the group in which the column line is included, the switching element being configured to switch the connection back and forth between a conducting and a non-conducting state, wherein the switching element is a field-effect transistor.

10. The summation circuit as recited in claim 8, wherein the matrix operation circuit has a plurality of storage elements configured in the form of a matrix in rows and columns, each connected to a respective one of the column lines and to a respective one of the row lines, each of the storage elements being set up to conduct a current into the respective column line that is a function of the voltage applied to the respective row line and a storage state of the storage element.

11. A method for operating a summation circuit for forming partial sums of vector matrix operations, the summation circuit including:

a matrix operation circuit that has a plurality of row lines each having one voltage terminal, and a plurality of column lines each having one current output, and the matrix operation circuit being configured to generate currents at the current outputs of the plurality of column lines, current strengths of which are a function of voltages applied to the voltage terminals, and one or more electricity metering circuits, each of the electricity metering circuits including:

a circuit input;

wherein the electricity metering circuit is configured to:

provide a ground potential at the circuit input, integrate the input current at the circuit input over time, store a storage charge that is increased up to a predetermined maximum storage charge proportionally to the integrated input current, in accordance with a proportionality, quantify the integrated input current in a charge unit, where the charge unit corresponds to the maximum storage charge, taking into account the proportionality, and determine the integrated input current, rounded down to the nearest integer charge unit, as a count sum, wherein each of the electricity metering circuits is assigned to a respective group of the column lines that includes a number of column lines, current outputs of the column lines within a group being connected to the current input of the electricity metering circuit assigned to the group, the method comprising the following steps:

setting the count sum of each of the electricity metering circuits to zero;

applying one or more vectors of a plurality of voltages to the voltage terminals for a predetermined period of time; and reading out the count sums.

12. The method as recited in claim 11, wherein during the time period in which one of the vectors of a plurality of voltages is applied, for each group of column lines, exactly one of the semiconductor switching elements provided in the connections from the column lines of the group to the associated electricity metering circuit is switched to the conducting state, different semiconductor elements being switched to the conducting state for different vectors of a plurality of voltages.

13. The method as recited in claim 11, wherein the time period is selected such that each of the count sums is greater than a minimum count sum, the minimum count sum being at least 20.

14. The method as recited in claim 11, wherein, after reading the count sums, in each case a remainder of the rounding down of the integrated input current to the count sum is determined.

15. The method as recited in claim 14, wherein the remainder being determined by measuring a remaining storage charge and taking into account a proportionality between maximum storage charge and the charge unit.

16. The method as recited in claim 14, wherein, before the setting of the count sums to zero, a vector of a plurality of reference voltages and a reference time duration are determined such that an application of the reference voltages to the voltage terminals over the reference time duration produces currents at the current outputs that, integrated over the reference time duration, correspond to a reference charge that is a fraction of the unit charge of the respective electricity metering circuit; and, after the reading out of the count sums, the following is carried out in a plurality of passes:

applying the reference voltage to the voltage terminals over the reference time period, checking, for each of the electricity metering circuits that has not yet been excluded from the check, whether the respective count sum has changed, and, when the respective count sum has changed, excluding the respective electricity metering circuit from the checking and determining the respective remainder based on a number of passes carried out, the remainder being determined as the unit charge minus the reference charge multiplied by the number of passes carried out prior to a current pass.

17. A computing unit configured to operate a summation circuit for forming partial sums of vector matrix operations, the summation circuit including:

a matrix operation circuit that has a plurality of row lines each having one voltage terminal, and a plurality of column lines each having one current output, and the matrix operation circuit being configured to generate currents at the current outputs of the plurality of column lines, current strengths of which are a function of voltages applied to the voltage terminals, and one or more electricity metering circuits, each of the electricity metering circuits including:

a circuit input;

wherein the electricity metering circuit is configured to:

provide a ground potential at the circuit input, integrate the input current at the circuit input over time, store a storage charge that is increased up to a predetermined maximum storage charge proportionally to the integrated input current, in accordance with a proportionality, quantify the integrated input current in a charge unit, where the charge unit corresponds to the maximum storage charge, taking into account the proportionality, and determine the integrated input current, rounded down to the nearest integer charge unit, as a count sum, wherein each of the electricity metering circuits is assigned to a respective group of the column lines that includes a number of column lines, current outputs of the column lines within a group being connected to the current input of the electricity metering circuit assigned to the group, the computing unit configured to:

set the count sum of each of the electricity metering circuits to zero;

apply one or more vectors of a plurality of voltages to the voltage terminals for a predetermined period of time; and read out the count sums.

18. A computing module, comprising:

a summation circuit for forming partial sums of vector matrix operations, the summation circuit including:

a matrix operation circuit that has a plurality of row lines each having one voltage terminal, and a plurality of column lines each having one current output, and the matrix operation circuit being configured to generate currents at the current outputs of the plurality of column lines, current strengths of which are a function of voltages applied to the voltage terminals; and one or more electricity metering circuits, each of the electricity metering circuits including:

a circuit input;

wherein the electricity metering circuit is configured to:

provide a ground potential at the circuit input;

integrate the input current at the circuit input over time;

store a storage charge that is increased up to a predetermined maximum storage charge proportionally to the integrated input current, in accordance with a proportionality;

quantify the integrated input current in a charge unit, where the charge unit corresponds to the maximum storage charge, taking into account the proportionality; and determine the integrated input current, rounded down to the nearest integer charge unit, as a count sum;

wherein each of the electricity metering circuits is assigned to a respective group of the column lines that includes a number of column lines, current outputs of the column lines within a group being connected to the current input of the electricity metering circuit assigned to the group; and a computing unit configured to operate the summation circuit, the computing unit configured to:

set the count sum of each of the electricity metering circuits to zero;

apply one or more vectors of a plurality of voltages to the voltage terminals for a predetermined period of time; and read out the count sums.

* * * * *